Nov. 3, 1970   R. O. GORDON ET AL   3,537,259
ELECTRO-HYDRAULIC ACTUATING SYSTEM OF THE REMOTE CONTROL TYPE
Filed Nov. 29, 1968

INVENTORS:
RICHARD O. GORDON
LEVERET C. RUSSLER

BY: James E. Nilles
ATTORNEY

United States Patent Office 3,537,259
Patented Nov. 3, 1970

3,537,259
ELECTRO-HYDRAULIC ACTUATING SYSTEM OF THE REMOTE CONTROL TYPE
Richard O. Gordon, Belgium, and Leveret C. Russler, Milwaukee, Wis., assignors to Harnishfeger Corporation, Milwaukee, Wis., a corporation of Wisconsin
Filed Nov. 29, 1968, Ser. No. 779,811
Int. Cl. F15b 15/18, 13/044
U.S. Cl. 60—52                                          9 Claims

ABSTRACT OF THE DISCLOSURE

An electro-hydraulic actuating system utilizes a continuously flowing actuating fluid in the remote control of a hydraulically operated actuator. The system includes a circulatory path for the fluid having a pump, and the actuator located therein. Means are provided for generating an electric signal corresponding to the desired operation of said actuator. A means for altering the flow rate of the circulating fluid, in response to the electric signal, is inserted in the path to vary the pressure in the system and to operate the actuator.

BACKGROUND OF THE INVENTION

Field of the invention

The present invention relates to actuating systems, and more particularly to actuating systems of the remote control electro-hydraulic type.

Description of the prior art

A typical fluid actuating system, for example, a vehicular hydraulic braking system, incorporates an operator controlled master cylinder and a plurality of slave or brake cylinders connected to the master cylinder by fluid lines. The system functions in accordance with the principles of hydrostatics to apply a braking pressure generated in the master cylinder to the braking cylinders. The application of pressure to the braking cylinders is accompanied by a small flow of the actuating fluid, such as oil. In most modern hydraulic braking systems the elements are designed to keep the flow of hydraulic fluid to a minimum.

Such actuating systems have found wide spread usage in spite of numerous shortcomings. A universal problem of such systems is the presence of air in the cylinders and lines. Air entrapped in the system is compressed by the actuating fluid when the latter is acted on in the master cylinder, thereby reducing the effectiveness of the slave cylinders. This air, which is not removed during normal operation of the system, must be removed from the fluid by an expensive and time consuming process termed "bleeding."

Because of the small flow of oil in the fluid system, there is an upper limit to the number of slave cylinders that may be operated by a single master cylinder. This limit often restricts usage of the system or requires additional master cylinders and the like therein.

In numerous instances, for example, in a hydraulic brake system for the bridge or trolley of an overhead travelling crane, some of the brake cylinders may be physically located a considerable distance from the master cylinder. The friction developed in the long fluid lines connecting the cylinders lessens the effectiveness of the brake cylinders. Where the fluid lines are of unequal length, the unequal line friction may cause unequal action or response times among the brake cylinders.

Further, and often more importantly, in instances in which portions of the actuating system are relatively movable with respect to other portions of the system, as in a crane of the above type having a stationary operator control station and a movable bridge and trolley containing hydraulic brakes, flexible hydraulic lines must be incorporated between the two portions to transmit the operator's commands to the portions of the system on the bridge or trolley. Such flexible fluid lines have proven to be a source of trouble in the past and have rendered the remote control of the hydraulic brakes from the operator control station very difficult.

SUMMARY OF THE PRESENT INVENTION

It is, therefore, the object of the present invention to provide an electro-hydraulic actuating system which overcomes the aforesaid problems and difficulties by utilizing a continuously flowing actuating fluid to pressurize the actuator and by employing operator controlled electric signal means to control the flow rate of the actuating fluid and the hydraulic operation of the actuator.

In general, the electro-hydraulic system of the present invention includes a source of fluid pressure; an actuator, such as a hydraulic cylinder, connected to the source to form a circulatory path; an electric signal means for providing an electric signal corresponding to the desired operation of said actuator; and means for varying the flow rate of the fluid in the circulatory path responsive to the electric signal to vary the pressure in the actuator. The latter means may either increase or decrease the flow rate to effect the pressure variation.

When used in machines having an operator control station and a relatively movable part containing the actuator which is remote from the operator control station, the system includes means by which the electric signal may be electrically transmitted from a stationary operator's control station to the movable part for effecting operation of the actuator.

DESCRIPTION OF THE PREFERRED EMBODIMENT

Figure 1:
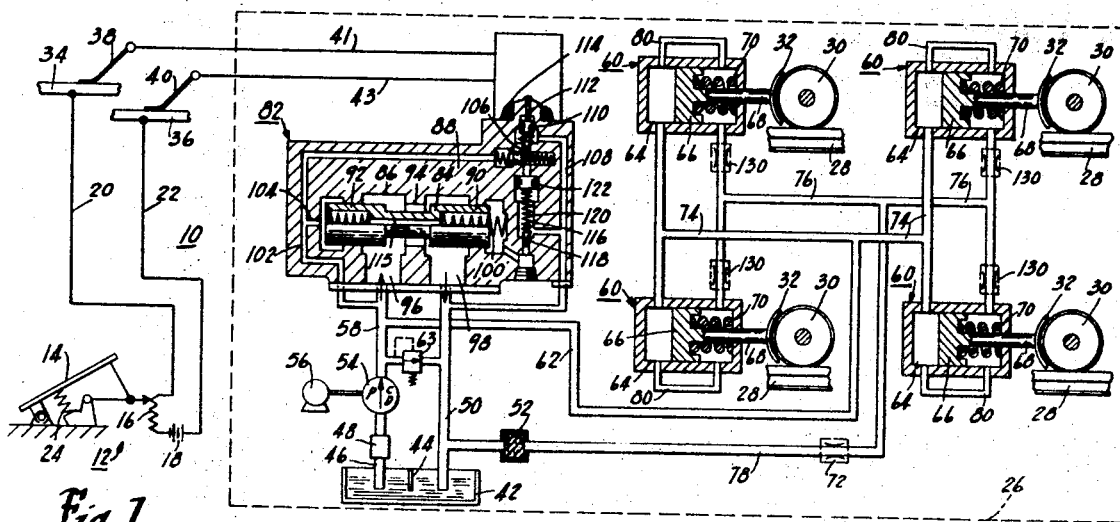
FIG. 1 is a somewhat diagrammatic and schematic view of one embodiment of the improved actuating system of the present invention.

The invention is described in an exemplary manner herein in connection with a brake system for the trolley of an overhead travelling crane. It will be appreciated that the system has numerous other applications.

The electro-hydraulic or fluid actuating system 10 includes an operator control station 12 from which the braking action of the system is controlled. A brake pedal 14 is connected to the wiper of potentiometer 16, connected in series with battery 18, so that an electrical signal proportional to the position of brake pedal 14 is provided in conductors 20 and 22. Spring 24 may be provided in association with brake pedal 14 to provide pedal "feel" to the operator and to return the pedal to a neutral position.

Trolley 26 is relatively movable with respect to operator control station 12. Typically operator control station 12 is fixedly mounted on the crane bridge containing rails 28. Trolley 26 moves on rails 28 by means of wheels 30 and is braked by brake bands or shoes 32 which are applied to the wheel or to a brake drum connected thereto.

The electrical signal in conductors 20 and 22 may be transmitted to conductors 41 and 43 of the moving trolley 26 by means of buses 34 and 36 and collectors 38 and 40.

Fluid actuating system 10 includes a fluid sump in which the returning fluid is placed after circulation and from which fluid is drawn for recirculation. Sump 42 is preferably open to the atmosphere so that air bubbles entrapped in the circulating fluid may rise to an exposed surface and escape from the fluid. A baffle 44 is included in sump 42 behind which air-free oil may be drawn from the sump. Output fluid line 46 includes strainer 48 while return fluid line 50 includes filter 52.

Pump 54 is connected in fluid line 46 for circulating fluid through fluid actuating system 10. In the embodiment of the invention shown in FIG. 1, pump 54 is of the fixed volume or constant delivery type, for example, of vane, gear or piston construction. Pump 54 is driven by a constant speed motor 56, typically a squirrel cage induction motor, energized through a collector means (not shown) similar to that used in conjunction with operator control station 12. The output of pump 54 is provided in fluid line 58. Pressure responsive fluid actuators 60 are connected to fluid line 58 and the output of pump 54 by means of fluid lines 62 and 74. A pressure relief valve 63 is connected between fluid line 58 and return fluid line 50 to bypass the output of pump 54 to sump 42 in the event excessive pressures are developed in fluid actuating system 10.

Each of fluid actuators 60 includes a cylinder 64, closed at both ends. A piston 66, positioned in cylinder 64, has a piston rod 68 extending from one end thereof. Brake shoe 32 is affixed to the exposed end of piston rod 68. A releasing spring 70 is included in cylinder 64 to retract piston rod 68 and release the brake.

Fluid line 74, connected to fluid line 62, discharges fluid from pump 54 to the head ends of pistons 66. Fluid line 76 removes fluid from the rod ends of pistons 66 and returns it to sump 42 via fluid line 78. Actuators 60 are thus effectively connected in parallel across fluid lines 62 and 78.

In order to provide for the flow of fluid through actuating means 60, necessary for the proper operation of a fluid actuating system employing a continuously circulating fluid, bypass lines 80 are provided in fluid actuators 60 to interconnect the portions of cylinders 64 on opposite sides of pistons 66.

A means 82 is provided in fluid actuating system 10 to alter the flow rate of the fluid circulated in the system by pump 54 responsive to the electrical signal from operator control station 12, thereby to alter the pressure in actuators 60 and effect a braking of trolley 26. Such means comprises a variable orifice which alters the fluid flow rate in accordance with the size of the orifice opening.

Variable orifice means 82 may comprise a spool valve having a valve spool 84 movable in an elongated valve chamber 86 in valve body 88. Valve spool 84 includes spaced collars 90 and 92 which mate with flange 94 to control the flow of fluid in and out of the laterally spaced inlet and outlet ports 96 and 98, opening into valve chamber 86. The variable orifice is formed by flange 94 and the collars of valve spool 84 and the size of the orifice is altered by the positioning of valve spool 84 in valve chamber 86 and the position of the collars with respect to the flange.

The position of valve spool 84 in valve chamber 86 is regulated by a pilot pressure control means. Valve spool 84 is biased into a left hand position, as shown in FIG. 1, by spring 100. The pilot pressure control means acts against spring 100 to control the position of the valve spool. A pilot fluid line 102 in valve body 88, includes a control port 104 by which fluid pressure may be applied to the valve spool. This pressure tends to move the valve spool 84 to the right against the force of spring 100.

The pressure exerted on valve spool 84 by the fluid in control port 104 is controlled by a two-stage regulator responsive to the electrical signal in conductors 41 and 43. A poppet valve 116 is interposed between control port 104 and drain 108. A fluid passage 115 in valve spool 84 connects control port 104 to poppet valve 116. Poppet valve 116 includes a poppet 118, a bias spring 120, and a piston 122. Poppet 118 regulates the flow of fluid between control port 104 and drain 108 and hence the pressure exerted on valve spool 84.

The position of poppet 118 is controlled by a relief valve 106 interposed in the fluid line 102 between control port 104 and drain 108. The poppet 110 of relief valve 106 is connected to the plunger 112 of solenoid 114, which is energized by the electrical signal in conductors 41 and 43 so that the relief action provided by a valve is a function of the electrical signal in the conductors.

Relief valve 106 controls the fluid pressure applied to piston 122 in accordance with its relief action which in turn controls the position of poppet 118, the flow of fluid between control port 104 and drain 108, the pressure exerted on valve spool 84, and the position of valve spool 84 in accordance with the electrical signal from operator control station 12. By varying the construction and exposed surface area of piston 122, the relationship of the pilot pressure to the controlled pressure may be placed at any desired ratio.

The inlet port 96 of variable orifice means 82 is connected to fluid line 58 receiving the output of pump 54. The outlet port 98 of variable orifice means 82 is connected to return line 50 leading to sump 42.

In operation, motor 56 is energized to operate pump 54. The output of pump 54 is directed to fluid line 58. The flow path of the fluid in fluid line 58 is divided. A portion of the fluid flows into inlet port 96 of variable orifice means 82 and out of outlet port 98 to return to sump 42. The remaining portion of the fluid flows in fluid lines 62 and 74, circulates through actuating means 60, and is returned through fluid lines 76, 78 and 50 to sump 42. Assuming no electrical signal is present in conductors 41 and 43 the flow in fluid line 62 and out fluid line 78 establishes a residual pressure in fluid actuating system 10. Brake bands 32 are retracted from wheels 30 by springs 70 to permit trolley 26 to move on rails 28.

As noted, supra, the continuously flowing fluid in actuating system 10 circulated by pump 54 permits the fluid to be periodically purged of air bubbles in sump 42 since the reservoir is open to the atmosphere. The continuous withdrawal of fluid from sump 42 by pump 54 also automatically makes up any fluid lost due to leaks and the like. The viscosity of the flowing fluid remains relatively uniform because of the circulation. The size and operating condition of motor 56 and pump 54 may be selected to accommodate any number of actuators 60.

To initiate braking of trolley 26, brake pedal 14 is depressed, providing an electrical signal in conductors 20 and 22 and 40 and 43 proportional to the desired braking action. This electrical signal energizes solenoid 114 and relief valve 106 of variable orifice means 82 to alter the pressure of the control fluid in the variable orifice means and the position of valve spool 84 thereby reducing the size of the orifice formed in the variable orifice means and lessening the flow of fluid through the valve and the amount which is returned to sump 42 therethrough.

As the volume of fluid provided to fluid line 58 must remain constant, due to the construction and operation of pump 54, a decrease in the fluid flow to sump 42 through variable orifice means 82 causes a corresponding increase in the flow of fluid through fluid line 62. The increased fluid flow in fluid lines 62 and 74 increases the pressure acting on the head ends of pistons 66, extending piston rods 68 and applying brake bands 32 to wheels 30 to brake trolley 26.

It will be appreciated that the braking action applied to trolley 26 includes a fast response time as the fluid is circulating in the system and already has the kinetic energy which formerly had to be supplied to it before braking could be effected.

To release brake band 32 from wheel 30, the electrical signal in conductors 41 and 43 is removed, or reduced, as by releasing brake pedal 14, allowing variable orifice means 82 to revert to its original condition and increase the fluid bypassed through the means to sump 42. This reduces the fluid flow in fluid line 62. The pressure in actuators 60 reverts to the original pressure, allowing releasing springs 70 to retract piston rods 68 to release the brakes of trolley 26.

The residual pressure in fluid actuating system 10 may be established at any desired level without altering the operation of pump 54 by the insertion of a fixed orifice means 72 in return line 78, as shown in phantom in FIG. 1. The fluid actuating system may be balanced for fluid lines of differing lengths and configurations by including additional orifice means 130 in one of the fluid lines connected to each of actuators 60, for example, fluid lines 76. The size of the orifices in each of these means is selected to equalize fluid flow through each of the actuators and insure that each of the actuators and associated fluid lines is provided with sufficient fluid flow to purge it of air bubbles.

Figure 2:
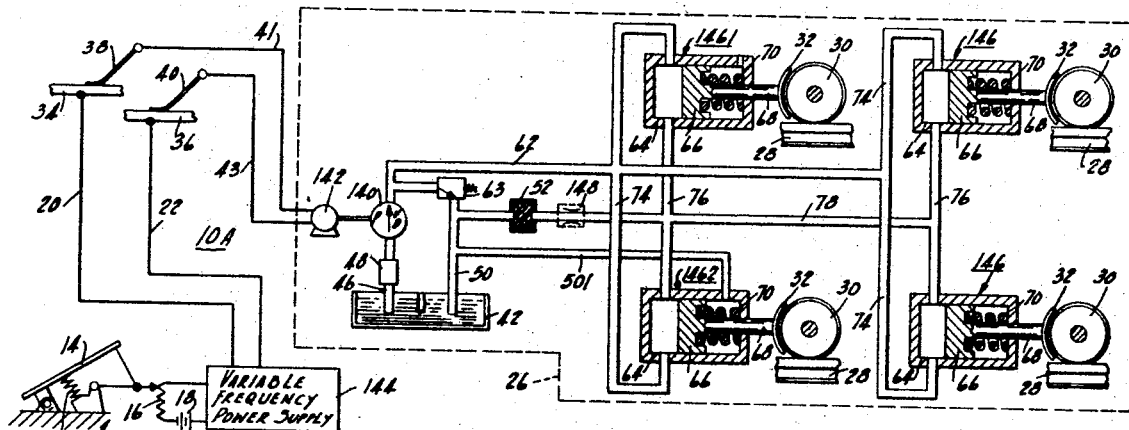
FIG. 2 is a somewhat diagrammatic and schematic view of a modified actuating system.

FIG. 2 shows an alternative embodiment of the fluid actuating system shown in FIG. 1, similar elements in the two embodiments being identified by identical numerals. Fluid actuating system 10A of FIG. 2 employs a variable volume pump 140 to alter the fluid flow in the system. The output volume of pump 140 may be varied by varying the speed of motor 142 driving the pump. For this purpose, operator control station 12a may include a variable frequency power supply 144, the output of which is a function of the position of brake pedal 14. A variable frequency signal is supplied through buses 34 and 36 and collectors 38 and 40 to alternating current motor 142 to control the speed thereof and the volumetric output of pump 140.

In the pressure responsive actuators 146 incorporated in the fluid actuating system 10A of FIG. 2, both of fluid lines 74 and 76 are connected to cylinder 64 at the head end of 66. The portion of cylinder 64 at the rod end of piston 66 may be vented to atmosphere as shown in cylinder 1461 but is preferably vented to fluid return line 50 by fluid line 501 as shown in connection with cylinder 1462. This prevents rusting or other deterioration of the interior of cylinder 64.

A fixed orifice means 148 is included in fluid line 78 to provide the residual pressure in the system.

In operation, with no braking signal from operator control station 12a, pump 140 may be operated at the speed necessary to provide a sufficient volume of fluid to generate the desired amount of residual pressure in fluid actuating system 10A when the fluid acts against orifice means 148. The residual pressure so generated is less than that necessary to apply the brakes of trolley 26. To apply the brakes of trolley 26, the frequency of the electrical signal in conductors 41 and 43 is increased, increasing the speed of motor 142 and the volumetric output of pump 140 and increasing the flow of actuating fluid in fluid actuating system 10A. The increased fluid flow when applied to fixed orifice means 148 increases the pressure in the fluid actuating system and in actuators 146 so as to apply brake bands 32 to wheels 30. The brakes are released by reducing the speed of motor 142 and the output of pump 140, thereby reducing the pressure in the actuators 146 and the fluid actuating system.

Figure 3:
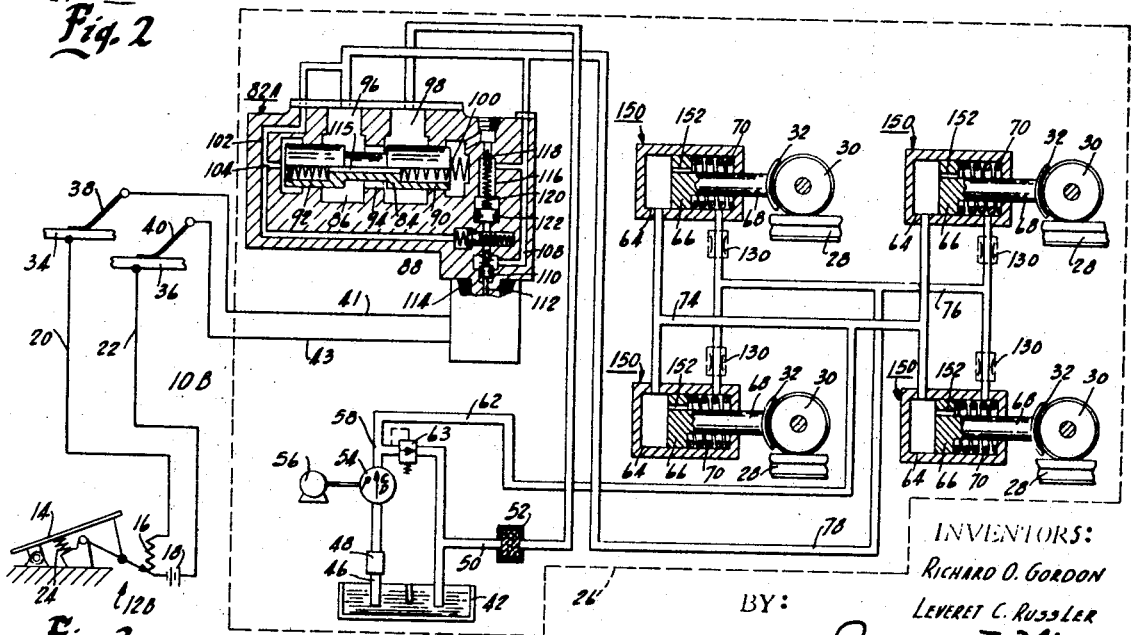
FIG. 3 is a somewhat diagrammatic and schematic view of another embodiment of the improved actuating system of the present invention.

FIG. 3 shows another embodiment of the fluid actuating system of FIG. 1. In fluid actuating system 10B, a variable orifice means 82a is interposed directly in fluid line 78 while fluid line 58, containing the output of pump 54, is connected solely to fluid line 62.

The pressure responsive actuators 150 of fluid actuating system 10B are similar to actuators 60 shown in FIG. 1. However, an internal port 152 in piston 66 replaces the external fluid line 80 for connecting the portions of each of cylinders 64 on opposite sides of pistons 66. Further, piston rod 68 is shown as increased in size so as to effectively decrease the area of the piston exposed to the actuating fluid in cylinder 64 at the rod end of piston 66. The area of piston 66 exposed to the actuating fluid in cylinder 64 at the head end of piston 66 remains unchanged.

The above described construction is advantageous in increasing the overall operating pressure of the system as the movement of piston 66, and piston rod 68, is dependent on the differential of force created by the pressure on the different piston areas presented to the fluid on opposite sides of piston 66 in cylinder 64 and not on the system pressure. Thus the operating pressure of the system may be increased without unduly altering the force on pistons 66. Such increase in pressure may be desirable to aid the operation of the variable orifice means 82 and 82a.

In operation, when an electric braking signal appears in conductors 41 and 43, variable orifice means 82a operates to reduce the orifice therein contained and restrict the flow of fluid in fluid actuating system 10B and increases the fluid pressure in actuators 60 to apply brake bands 32 to wheels 30. Variable orifice means 82a thus acts to control the pressure in actuators 60 by directly controlling the flow of fluid in fluid lines 62, 74, 76 and 78 rather than indirectly controlling it by regulating the division of the output of constant volume pump 54 between the portion going to the actuating means in fluid line 62 and the portion returning to the sump in fluid line 50. As the entire output of pump 54 is circulating through the fluid lines and actuators of fluid actuating systems 10B at all times, maximum purging of air bubbles occurs and the energy of the fluid can be utilized in the braking action in the shortest possible time.

It is appreciated that other modifications and variations may be made to the fluid actuating system of the present invention. It is intended to include in the appended claims, all such modifications and variations as fall within the true scope and spirit of the invention.

What is claimed is:

1. An electro-hydraulic actuating system for remotely controlling a hydraulically operated actuator, said system including said actuator and further comprising:
   a source of fluid pressure;
   said actuator comprising a fluid cylinder having an elongated hollow body in fluid communication with said source to form a circulatory path through which an actuating fluid is circulated by said source, a movable piston mounted on said body and having a pair of opposing surfaces exposed to the fluid in said body, said piston being formed so that one of said opposing surfaces is greater in area than the other of said surfaces, said actuator further having a fluid connecting means for interconnecting the portions of said hollow body on opposite sides of said piston, whereby the differential force applied to the piston by the actuating fluid pressure acting on the different areas of the opposing surfaces moves said piston in said hollow body;
   electric signal means for providing an electric signal corresponding to the desired operation of said actuator; and
   flow rate control means responsive to said electric signal and operatively associated with said source for altering the flow rate of the fluid in said circulatory path to establish fluid pressure in said actuator and to vary said established pressure in accordance with said electric signal between a residual pressure and a pressure sufficient to provide the desired operation from said actuator.

2. The electro-hydraulic actuating system of claim 1 wherein the body of said actuator includes fluid ports opening into the hollow body on opposite sides of said piston, said fluid ports being in fluid communication with said source of fluid pressure.

3. The electro-hydraulic actuating system of claim 1 further defined in that said source is a pump having an inlet and an outlet, said pump being of the variable discharge type capable of delivering fluid at variable rates at the pump outlet, said electro-hydraulic system being further characterized in that said flow rate control means includes orifice means located between said actuator and the inlet of said pump for establishing pressure in said actuator and also includes means connected to said pump for altering the discharge rate thereof for varying the pressure in said actuator and the operation thereof.

4. The electro-hydraulic actuating system of claim 3 further defined in that said pump discharge rate altering means comprises a variable speed motor connected to and driving said pump.

5. The electro-hydraulic actuating system of claim 1 further defined in that said source is a pump having an inlet and an outlet, said pump being of the constant delivery type capable of delivering fluid at a constant rate at its outlet and further characterized in that said flow rate control means is inserted in said circulatory path between the inlet and an outlet of said pump and comprises a variable orifice bypass means responsive to said electric signal for returning a selected portion of the discharge of said pump to the inlet thereof and bypassing said selected portion from the circulatory path of said system, thereby to alter the actuating fluid flow rate in said path and to vary the pressure in said actuator and the operation thereof.

6. The electro-hydraulic actuating system of claim 1 further defined in that said source is a pump having an inlet and an outlet, said pump being of the constant delivery type capable of delivering fluid at a constant rate at its outlet and further characterized in that said flow rate control means is inserted in said circulatory path at the inlet of said pump and between said actuator and pump and comprises variable orifice means responsive to said electric signal for varying the size of the orifice, the flow rate of said actuating fluid in said circulatory path, and pressure in said actuator in accordance with said electric signal.

7. The electro-hydraulic actuating system of claim 1 further defined as including a plurality of actuators connected in parallel fluid communication with said source, each of said parallel connected actuators having an orifice means connected thereto for controlling the flow of fluid through said actuator.

8. The electro-hydraulic actuating system of claim 1 suitable for use in a machine of the type having an operator control station and also having a part relatively movable with respect to said operator control station, said actuating system being further defined in that said electric signal means is located in said operator control station and the remaining portions of said actuating system are mounted on said relatively movable part, said actuating system including means for transmitting said electric signal between said operator control station and the movable part of the machine.

9. The electro-hydraulic actuating system of claim 8 further defined as comprising an electro-hydraulic braking means and wherein said electric signal means provides an electric signal corresponding to the desired braking operation of said braking means for varying the fluid pressure in said braking means in accordance with said electric signal to provide the desired braking operation to said means.

References Cited

UNITED STATES PATENTS

| 2,330,739 | 9/1943 | Piron. |
| 2,332,593 | 10/1943 | Nutt et al. |
| 2,674,854 | 4/1954 | Church. |
| 2,677,285 | 5/1954 | Volk. |
| 2,830,859 | 4/1958 | Parsons _____ 60—52 XR |
| 3,046,743 | 7/1962 | Burley. |
| 3,099,136 | 7/1963 | Carlson. |
| 3,424,260 | 1/1969 | Stone et al. |

EDGAR W. GEOGHEGAN, Primary Examiner

U.S. Cl. X.R.

91—47, 49, 459